United States Patent [19]

Choudhury et al.

[11] Patent Number: 5,699,548

[45] Date of Patent: Dec. 16, 1997

[54] METHOD AND APPARATUS FOR SELECTING A MODE FOR UPDATING EXTERNAL MEMORY

[75] Inventors: Mustafiz R. Choudhury, Sunnyvale; Sundaravarathan R. Iyengar, San Jose; Tsan-Kuen Wang, Milpitas; Murali S. Talwai, Folsom; James Francis McKevitt, III, San Jose, all of Calif.

[73] Assignee: Intel Corporation, Santa Clara, Calif.

[21] Appl. No.: 456,716

[22] Filed: Jun. 1, 1995

[51] Int. Cl.$^6$ ............................ G06F 12/08; G06F 12/00
[52] U.S. Cl. ................................ 395/469; 395/470
[58] Field of Search ............................ 395/469, 470

[56] References Cited

U.S. PATENT DOCUMENTS

| | | | |
|---|---|---|---|
| 5,025,366 | 6/1991 | Baror | 395/455 |
| 5,301,298 | 4/1994 | Kagan et al. | 395/468 |
| 5,469,555 | 11/1995 | Ghosh et al. | 395/460 |
| 5,471,637 | 11/1995 | Pawlowski et al. | 395/296 |
| 5,485,592 | 1/1996 | Lau | 395/470 |
| 5,522,057 | 5/1996 | Lichy | 395/471 |
| 5,524,234 | 6/1996 | Martinez, Jr. et al. | 395/468 |

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

A processor capable of selecting between a write-back and a write-through mode of operation includes a bus interface unit for transferring information across the external bus. A local cache memory is coupled to the bus interface unit for storing information received from the bus interface unit. The processor also includes a control unit coupled to the cache memory and the bus interface unit. The control unit is operable to restart an interrupted operation from a point of interruption. A storage device coupled to the control unit stores a value corresponding to the point of interruption of the operation.

14 Claims, 15 Drawing Sheets

METHOD AND APPARATUS FOR SELECTING A MODE FOR UPDATING EXTERNAL MEMORY

FIELD OF THE INVENTION

The present invention relates to the field of electronic data processing devices. More particularly, the present invention relates to the transfer of information between a data processor and external memory.

BACKGROUND Of THE INVENTION

The memory-hierarchy design of a computer system generally employs one of two different write policies when writing to a cache: write-through or write back. In the write-through policy, information is written to both the cache memory and to the lower-level memory, e.g., main memory. In contrast, in the write-back policy, information is written only to the cache, and modified cache data is written to main memory when it is replaced. Both the write-through and write-back policies have their advantages, and are prevalent in different types of computer systems. For instance, in some systems it is important that the lower-level memory (external to the microprocessor) maintain the most current copy of the data. These systems normally employ a write-through policy since all memory writes by the microprocessor into the cache are immediately written to external memory.

On the other hand, certain multiprocessor systems may select the write-back policy to free up memory bandwidth. In a write-back mode, when the microprocessor performs memory writes to the cache memory, a modified (i.e., dirty) bit is set for allocations affected by the memory writes. The microprocessor does not immediately pass along the memory write and the modified data is kept in the cache memory until the information is later requested or replaced.

Whether write-back or a write-through, the particular write policy selected must generally be utilized consistently throughout the computer system. For example, if a processor operating in accordance with a write-back mode were inserted into a system configured for write-through operations, many components in the system would not accept a write-back transfer. This could potentially cause the entire system to malfunction.

Sometimes it is desirable to replace a processor in an existing system with a new processor to utilize new features and advancements in processor design and technology. Unfortunately, not all computer systems employing a write-back policy can be modified to accept write-back processors. This means that two different processor types are often required: one for use in systems strictly utilizing a write-through policy, and another for systems employing a write-back policy.

What is needed is a processor that can be used in both types of systems. Such a processor should be capable of selecting between write-back and write-through modes of operation. In this way, external memory can be updated in systems that accept write-back updates, as well as in systems that only accept write-through updates. To allow for proper operation in systems that accept write-back operations, such a processor should be capable of performing write-back transfers and updating external memory after an external snoop request.

As will be seen, the present invention overcomes the problems of the prior art by providing a processor which can select between write-back and write-through modes of operation.

SUMMARY OF THE INVENTION

A novel data processor and method of updating external memory is described. The data processor comprises a bus interface unit receiving information from and transmitting information to an external bus, a cache memory coupled to the bus interface unit, and a control unit coupled to the bus interface unit and the cache memory for updating the external memory with information from the cache memory in either a write-through or a write-back mode. The data processor also includes an update mode selector circuit coupled to the control unit, which receives an update mode signal that determines a selected one of the write-through or write-back mode. The update mode signal is sampled on a falling edge of a reset signal that occurs during a first period.

The method of updating the external memory includes receiving an update mode signal which indicates that the external memory is to b,: updated in either a write-back or write-through mode and sampling the update mode signal on a falling edge of a reset signal during a first period. Altered information in the cache is passed to the external memory based on the selection of the update mode as either a write-through or write-back mode.

BRIEF DESCRIPTION OF THE DRAWINGS

The present invention is illustrated by way of example in the figures of the accompanying drawings, in which like reference numerals refer to similar elements, and in which.

DETAILED DESCRIPTION

A novel processor capable of selecting between modes of updating external memory is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless stated otherwise, it is appreciated that terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
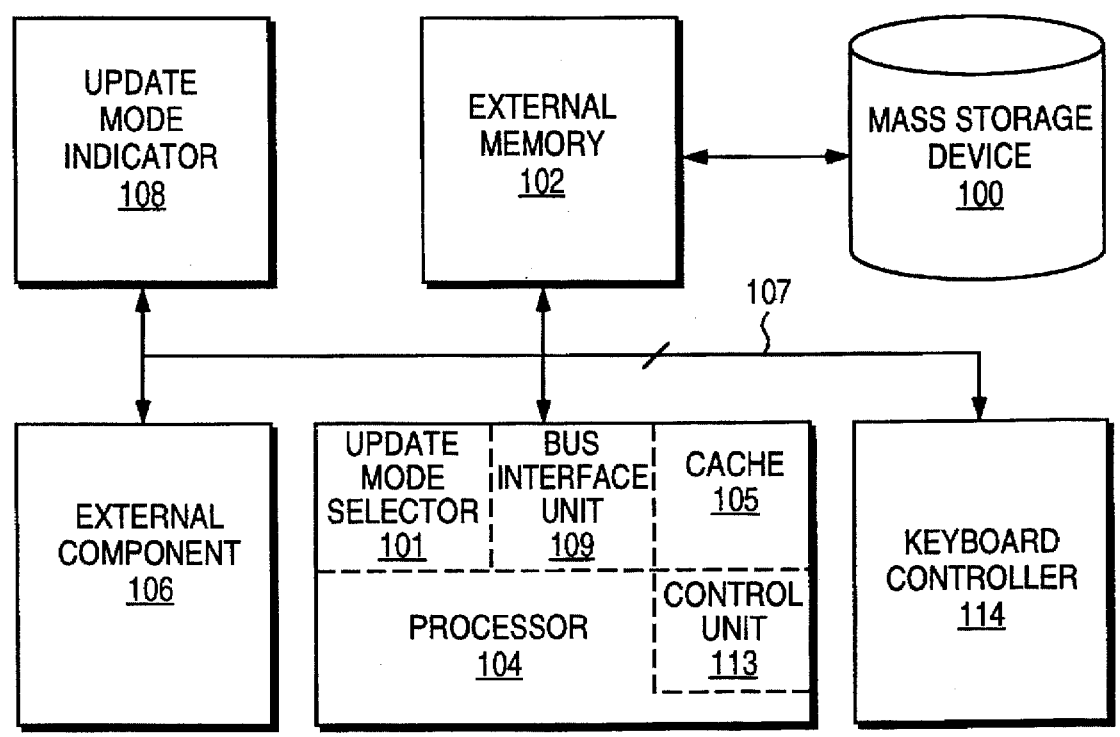
FIG. 1 is a block diagram of a computer system according to one embodiment of the present invention.

FIG. 1 illustrates a computer system according to one embodiment of the present invention. The computer system includes mass storage device 100, external memory 102, update mode indicator 108, keyboard controller 114 and processor 104. The computer system may also include external component 106. Each of these elements are commonly coupled via a bus 107. Keyboard controller 114 allows a standard keyboard to be coupled to the computer system. External memory 102 may be an ordinary random access memory (RAM) or a cache memory. Mass storage device 100 may be a hard disk drive, floppy disk drive, CD-ROM drive or a flash memory device. In the configuration shown, mass storage device 100 is coupled to coupled to bus 107 through external memory 102.

Microprocessor 104 executes instructions that transfer information to external memory 102 and/or external component 106 via bus 107. Information may also be transferred back to processor 104 from external memory 102 and/or external component 106 on bus 107. Update mode indicator 108 transfers information regarding an update mode of the computer system to processor 104 along bus 107.

Processor 104 is shown comprising a local cache memory 105, bus interface unit 109, control unit 113 and update mode selector 101. Bus interface unit 109 handles the transmission of data, addresses, and control signals on bus 107. Control unit 113 controls and manages all data transfer operations in processor 104. Update mode selector 101 selects one of a plurality of writing policies or modes for updating external memory 102. For example, when update mode selector 101 selects a particular mode, processor 104 updates external memory 102 with data in cache 105 consistent with the mode selected. Update mode selector 101 may be incorporated in control unit 113, or it may reside within another functional unit block of processor 104.

In the embodiment of FIG. 1, update mode selector 101 selects either a write-through or a write-back policy to enable processor 104 to operate in either a write-through or a write-back computer system. Hence, update mode selector 101 chooses the appropriate mode for updating external memory.

Figure 2:
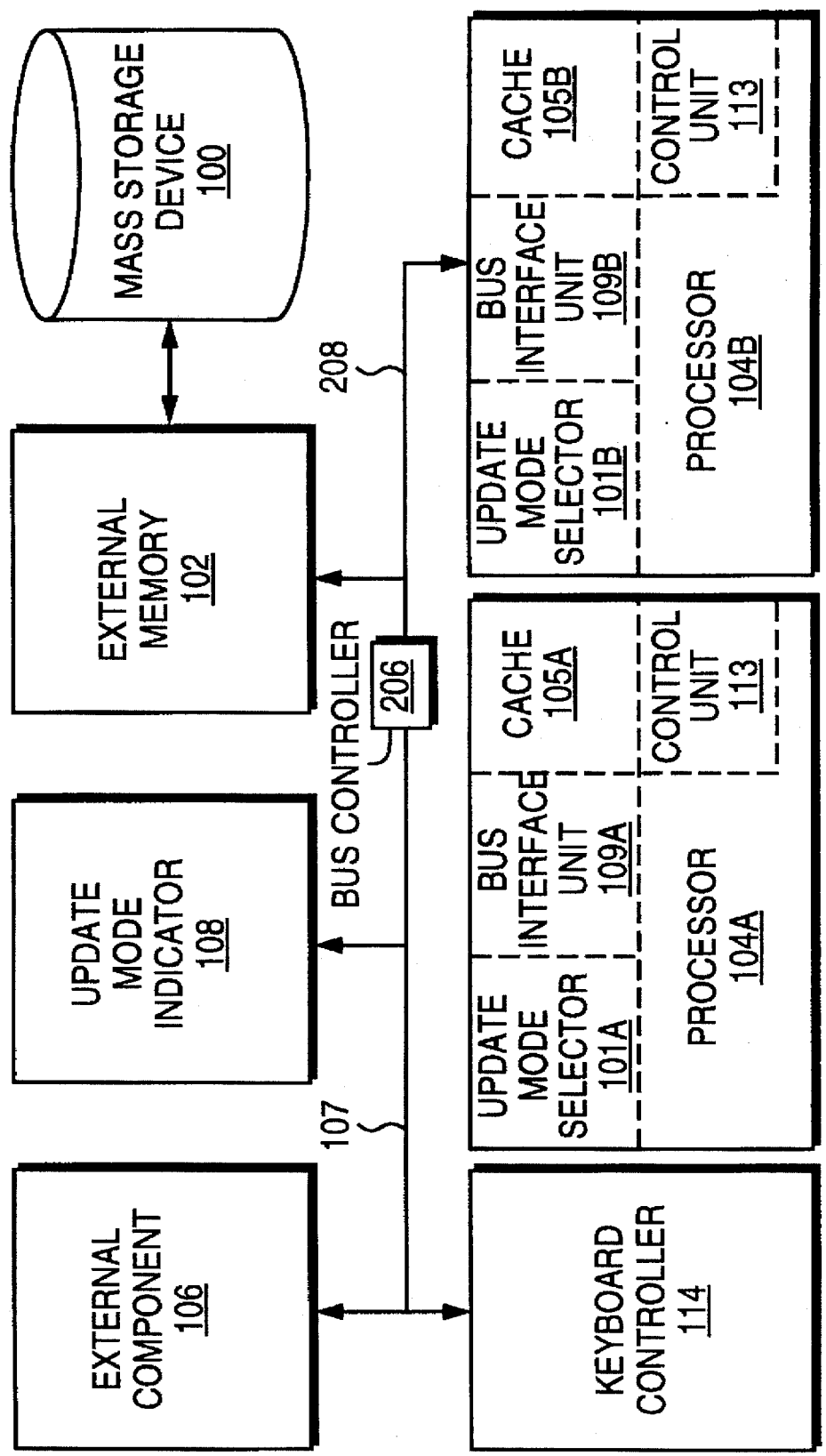
FIG. 2 illustrates in block diagram form a computer system of another embodiment of the present invention.

FIG. 2 illustrates in block diagram form a computer system of another embodiment of the present invention. The computer system of FIG. 2 is similar to the computer system of FIG. 1 except the system of FIG. 2 includes multiple processors. The computer system of FIG. 2 also comprises a bus controller 206 for controlling buses 107 and 208. Each processor 104 (e.g., 104a & 104b) has an associated update mode selector 101. Each update mode selector 101 selects between a plurality of modes of updating external memory. In most instances, the mode selected for one processor is the same mode selected for the other processor since the conditions leading to the selection of one mode for one processor usually applies for the other processors in the system.

In the embodiment of FIG. 2, processor 104 may incorporate two or more modes of updating external memory which include write-through and writeback modes. In accordance with the write-through mode, all memory writes by a processor 104 to its cache 105 are immediately passed along to external memory 102. The result is that external memory 102 always contains valid data.

A second mode of updating external memory is the buffered write-through mode. In buffered write-through, processor 104 performs memory writes to cache 105 and then passes the memory writes along to external memory 102 if bus 107 is available. If bus 107 is unavailable, cache 105 buffers the memory writes. This buffering operation frees processor 104 so that it can continue normal data processing operations. When bus 107 becomes available, cache 105 independently completes the writes to external memory 102 from the buffer.

A third mode of updating external memory is the write-back mode in which processor 104 performs memory writes to cache 105 and sets a dirty bit for all locations affected by the memory writes. In accordance with the write-back mode, processor 104 does not immediately pass along the memory write even if bus 107 is available. Instead, the information is kept within cache 105 until, for example, information is requested by another processor 104 in the system or by external component 106. At that point, cache 105 updates external memory 102 with the data if the dirty bit is set for that location. Alternatively, the system could issue a cache flush operation, at which point, cache 105 updates external memory 102 with current information in all locations having their dirty (altered) bits set.

It is appreciated that other modes of updating external memory may be incorporated into processor 104 in accordance with the present invention.

As explained above, update mode selector 101 selects the write policy for processor 104, e.g., either a write-through or a write-back mode of operation. Processor 104 and cache 105 then operate in accordance with the mode selected. By way of example, in the write-through mode, if processor 104 receives a cache flush signal (FLUSH#), cache 105 is subsequently flushed in one clock cycle. In the write-back mode, however, if processor 104 receives a FLUSH# signal, processor 104 writes-back all modified lines to external memory 102 and then invalidates the modified lines in cache 105. Processor 104 then runs a special cycle (i.e., a flush acknowledge cycle) on bus 107 indicating the end of flushing.

Additionally, in write-back mode processor 104 does not drive the pseudo-lock pin (PLOCK#). The PLOCK# pin indicates that the current bus transaction requires more than one bus cycle to complete.

Figure 3:
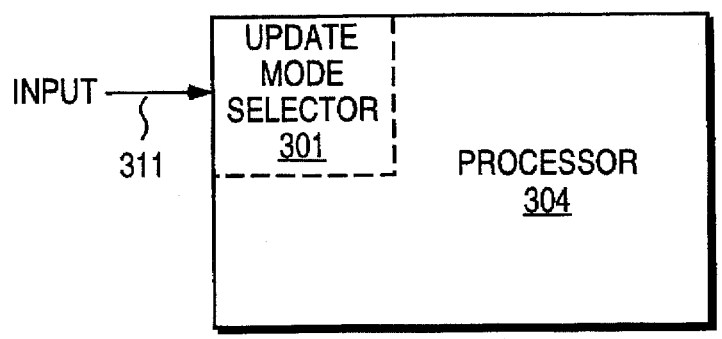
FIG. 3 illustrates another embodiment of the present invention.

FIG. 3 illustrates another embodiment of the processor of the present invention. Processor 304 includes update mode selector 301 and input pin 311. Input pin 311 couples an external select signal to update mode selector 301. For instance, a first signal at input 311 may indicate the selection of a write-through mode, whereas a second signal may indicate a write-back mode of operation.

Thus, input pin 311 provides external devices to apply selection signals to update mode selector 301. For example, the first signal may simply be ground potential, and second signal may be a 5V or 3.3V potential. One possibility is to have the second signal generated by update mode indicator 108 (FIGS. 1 or 2). Furthermore, a third signal may be transmitted by floating input pin 311 to indicate the selection a write-through mode of operation.

Figure 4:
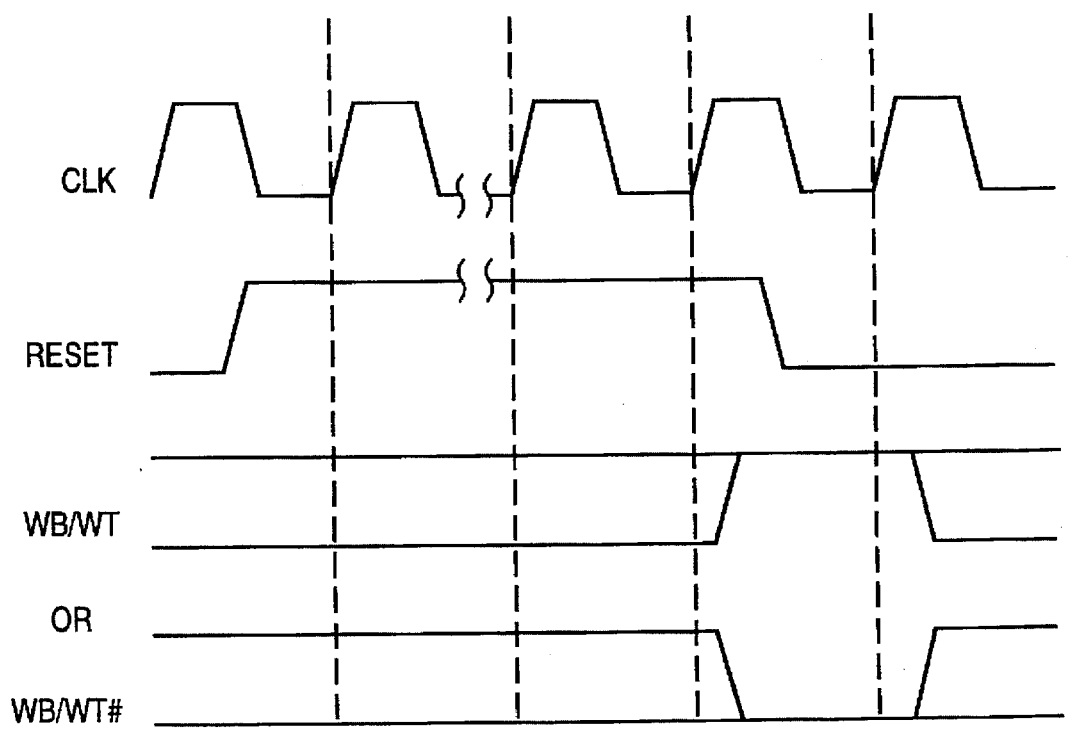
FIG. 4 is a timing diagram showing the operation of the update mode indicator in accordance with one embodiment of the present invention.

FIG. 4 is a timing diagram showing the operation of update mode indicator 108 in accordance with the earlier described embodiments. For example, update mode indicator 108 may generate the first signal or the third signal when selecting the write-back mode of updating external memory, and generate the second signal when selecting the write-through mode. The first signal, the second signal, or the third signal is supplied by update mode indicator 108 through a pin. In the timing diagram of FIG. 4, this pin is labeled WB/WT#. Processor 304 samples the WB/WT# pin during the falling edge of a reset signal. Processor 304 does not sample the WB/WT# pin more than one clock before the falling edge of the reset signal and does not sample the WB/WT# pin after one clock following the falling edge of the reset signal. Thus, the update mode of processor 304 is determined only during the falling edge of the reset signal.

The first signal can be generated by coupling the WB/WT# pin to ground. The second signal can be generated by coupling the WB/WT# pin to a high voltage potential, e.g. 5 volts or 3.3 volts. The third signal can be generated by leaving the WB/WT# pin unconnected. By way of example, the WB/WT# pin may be coupled to a pull-down resistor which causes the third signal to have the same effect as the first signal. Alternatively, update mode indicator 108 can be a state machine which generates the first, second or third signal during the falling edge of the reset signal.

Figure 5:
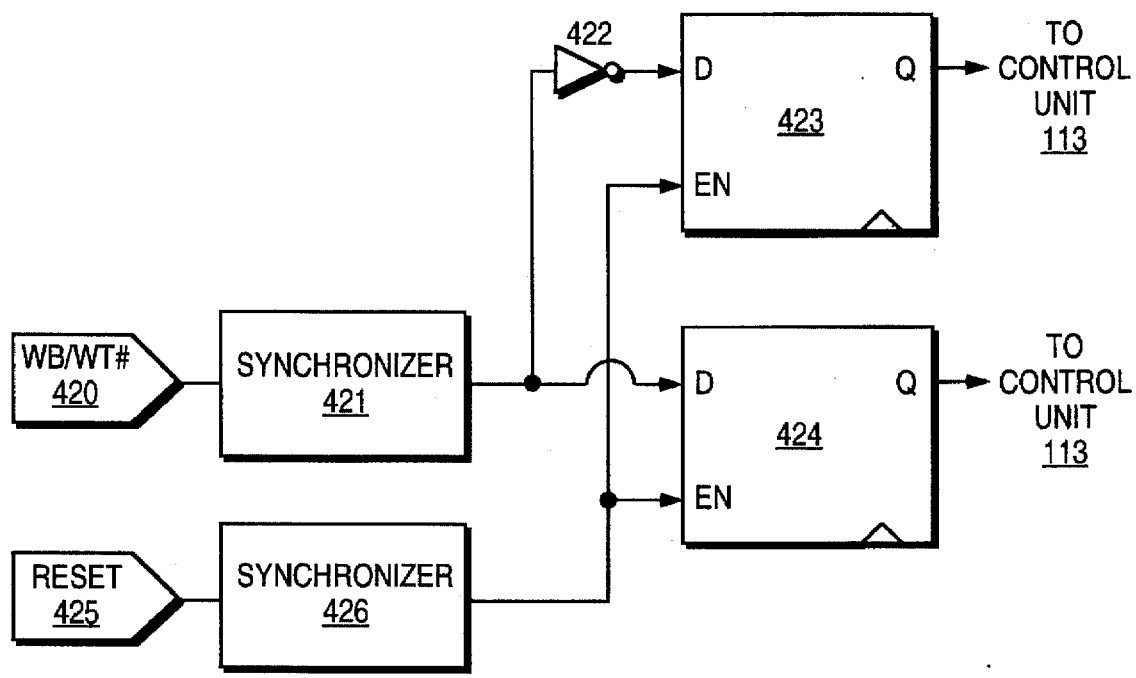
FIG. 5 illustrates a block diagram of an update mode selector implemented in an embodiment of the present invention.

FIG. 5 illustrates a block diagram of an update mode selector implemented in an embodiment of the present invention. Update mode selector 301 comprises WB/WT# signal input 420, synchronizer 421, inverter 422, flip-flop 423, flip-flop 424, reset signal input 425 and synchronizer 426. Update mode selector 301 is coupled to control unit 113. Update mode selector 301 can reside in control unit 113 or can reside separately from control unit 113. WB/WT# signal input 420 receives the first, second or third signal from update mode indicator 108 of FIG. 1 or FIG. 2. The signal from update mode indicator 108 (WB/WT# signal) is transmitted to synchronizer 421. Synchronizer 421 comprises of a single flip-flop or can comprise of a plurality of flip-flops positioned back-to-back. The signal from update mode indicator 108 (WB/WT# signal) is asynchronous and synchronizer 421 transforms the asynchronous signal into a synchronous signal. Making the asynchronous signal into a synchronous signal allows flip-flops subsequent in the circuit and triggered by a clock signal to function properly. In addition, synchronizer 421 ensures that the signal transmitted has a sufficient pulse width to allow flip-flops subsequent in the circuit and receiving the signal to function properly. When the signal from update mode indicator 108 has a short pulse length, synchronizer 421 lengthens the pulse to the required length. As described above, a single flip-flop can be used for synchronizer 421. However, a plurality of flip-flops is used for synchronizer 421 when greater assurance of proper pulse length and timing with respect to the clock signal is desired. Increasing the number of flip-flops positioned back-to-back for synchronizer 421 increases the likelihood of proper length and timing.

Synchronizer 421 transmits a latched version of the WB/WT# signal to DQ flip-flop 423 through inverter 422 and DQ flip-flop 424. When the latched WB/WT# signal is a low voltage potential (as a result of the first or third signal provided to WB/WT# input 420), DQ flip-flop 423 transmits a high voltage potential to control unit 113. This high voltage potential activates the write-through mode of updating external memory in control unit 113. At the same time, when the latched WB/WT# signal is a low voltage potential, DQ flip-flop 424 transmits a low voltage potential to control unit 113. This low voltage potential deactivates the write-back mode of updating external memory in control unit 113. On the other hand, when the latched WB/WT# signal is a high voltage potential (as a result of the second signal provided to WBANT# input 420), DQ flip-flop 423 transmits a low voltage potential to control unit 113. This low voltage potential deactivates the write-through mode of updating external memory in control unit 113. At the same time, when the latched WB/WT#signal is a high voltage potential, DQ flip-flop 424 transmits a high voltage potential to control unit 113. This high voltage potential activates the write-back mode of updating external memory in control unit 113.

Control unit 113 can comprise of a state machine or a plurality of state machines which receives the signal from DQ flip-flop 423 and the signal from DQ flip-flop 424. When control unit 113 receives a high voltage potential from DQ flip-flop 423 and a low voltage potential from DQ flip-flop 424, control unit 113 updates external memory using the write-through mode. Under the write-through mode, all memory writes by control unit 113 into cache 105 of FIG. 1 or FIG. 2 are immediately passed along to external memory. In addition, when control unit 113 receives a FLUSH# signal, cache 105 is flushed in one clock period. On the other hand, when control unit 113 receives a low voltage potential from DQ flip-flop 423 and a high voltage potential from DQ flip-flop 424, control unit 113 updates external memory using the write-back mode. Under the write-back mode, processor 104 of FIG. 1 or FIG. 2 performs memory writes into cache 105 and a modified dirty (altered) bit is set for all locations affected by the memory writes. Processor 104 does not immediately pass along the memory write even if bus 107 of FIG. 1 or FIG. 2 is available. Instead, the information is kept solely in cache 105 until information is requested by another processor 104 in the system or by component 106 of FIG. 1 or FIG. 2. At that point, cache 105 updates external memory with the information if the modified dirty (altered)

bit is set for that location. In addition, when control unit 113 receives a FLUSH# signal, control unit 113 processes the FLUSH# and then runs two special cycles on bus 107 to indicate the end of flush processing. Moreover, in the write-back mode, control unit 113 never drives the PLOCK# pin.

Figure 6:
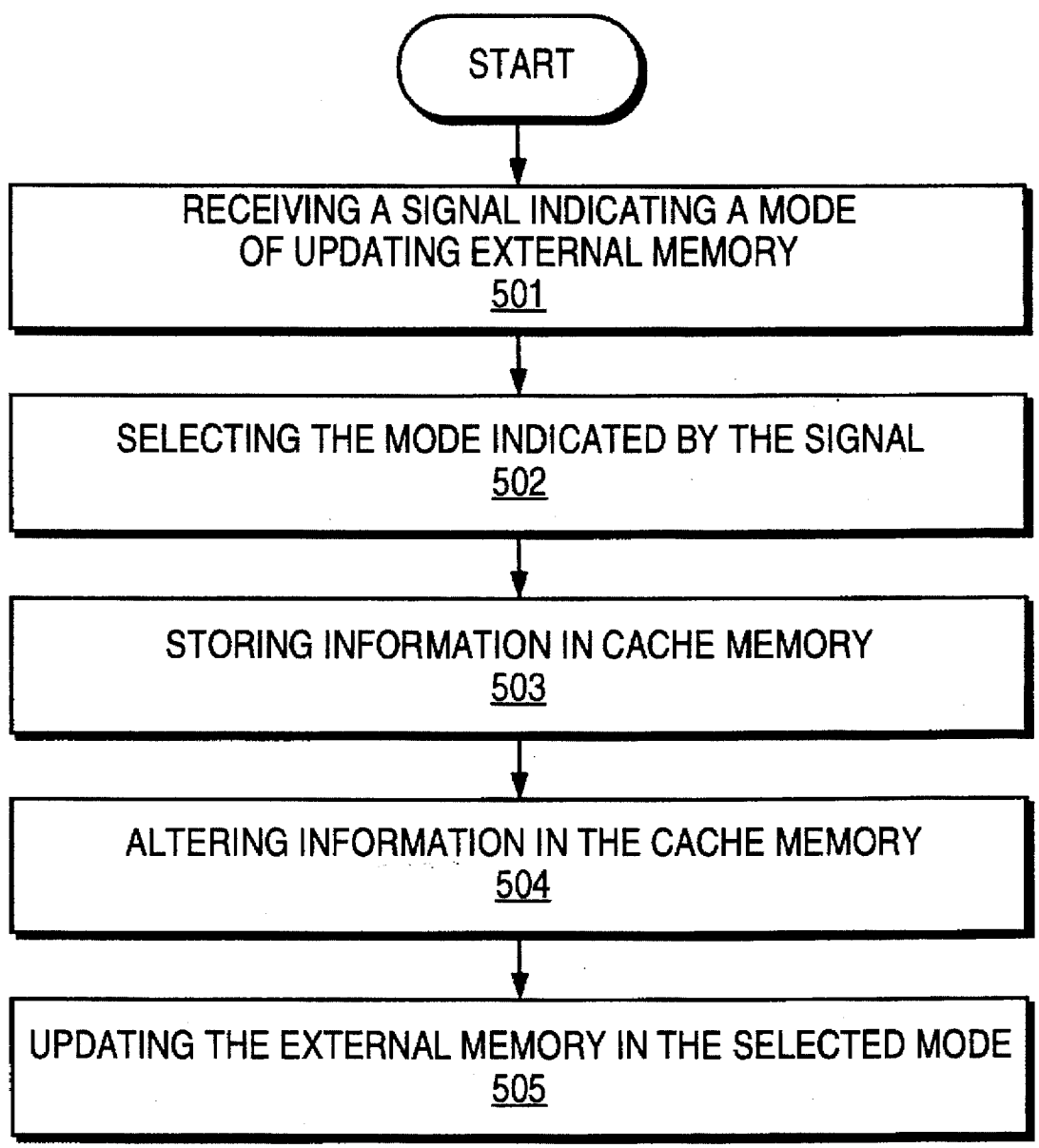
FIG. 6 is a flowchart diagram illustrating the operation of one embodiment of the processor of the present invention.

FIG. 6 is a flowchart diagram illustrating the operation of one embodiment of the processor of the present invention. As indicated, the processor updates external memory by first receiving a signal indicating a mode of updating external memory (block 501). The signal may be applied in a variety of ways, such as on a bus, a shared line or a dedicated line. In one embodiment, the signal is asserted on a dedicated WB/WT# line through a dedicated WB/WT# pin. The WB/WT# line and pin are only sampled during the falling edge of the RESET signal. Thus, the processor only receives the signal indicating a mode of updating external memory during the falling edge of the RESET signal.

In addition, there are only two possible modes of updating external memory in the embodiment of FIG. 6: the write-through mode and the write-back mode. The processor receives one of three signals during the falling edge of the RESET signal. The three signals are a low voltage potential, a high voltage potential and a floating potential. A low voltage potential or a floating potential received by the processor indicates a write-through mode of updating external memory. On the other hand, a high voltage potential indicates a write-back mode of updating external memory.

The processor then selects the mode indicated by the signal as shown in block 502. If the processor receives a low voltage potential or a floating potential during the falling edge of the RESET signal, the processor selects the write-through mode. If the processor receives a high voltage potential during the falling edge of the RESET signal, the processor selects the write-back mode of updating external memory. The memory in then stores information from external memory in cache memory as shown in block 503. The processor then alters information stored in the cache memory as shown in block 504. The storing and altering of information in cache memory occurs regularly as a part of normal processor operation. The processor then updates the external memory in the selected mode, either write-through mode or write-back mode as shown in block 505.

Alternatively, the computer system may utilize a write-back mode of updating external memory. When external component 106 of FIG. 1 or FIG. 2 requests data from external memory 102, the data in external memory 102 must be updated. External component 106 accomplishes the update by initiating an inquire operation over bus 107. The inquire operation checks whether a particular address is located in cache 105. If a particular address is located in cache 105 and the associated data has been modified, processor 104 asserts a signal to indicate the address match and data modification (i.e., a "hit" to a modified line).

When bus 107 is available and processor 104 is not performing a read or write operation, processor 104 services the inquire operation and updates external memory 102 in response to the hit to a modified line. However, when processor 104 is performing a read or write operation and a backoff operation is not initiated on bus 107, processor 104 continues the read or write operation and services the inquire operation and updates external memory 102 after completion of the read or write operation. A backoff operation involves the assertion of an active low signal (BOFF#) by external component 106 requesting processor 104 to float bus 107 in the next clock period.

On the other hand, when processor 104 is performing a read or write operation and a backoff operation is initiated on the bus, processor 104 discontinues the read or write operation and services the inquire operation and updates external memory after the BOFF# signal is deasserted. Processor 104 then continues the read or write operation from the point processor 104 left off previously. In most situations, it is desirable to interrupt the read or write operation and update external memory in response to the read or write operation from processor 104. This interruption ensures that external component 106 always obtains the most up-to-date information in external memory. Consequently, a backoff operation usually accompanies a hit to a modified line in some other cache.

Figure 7:
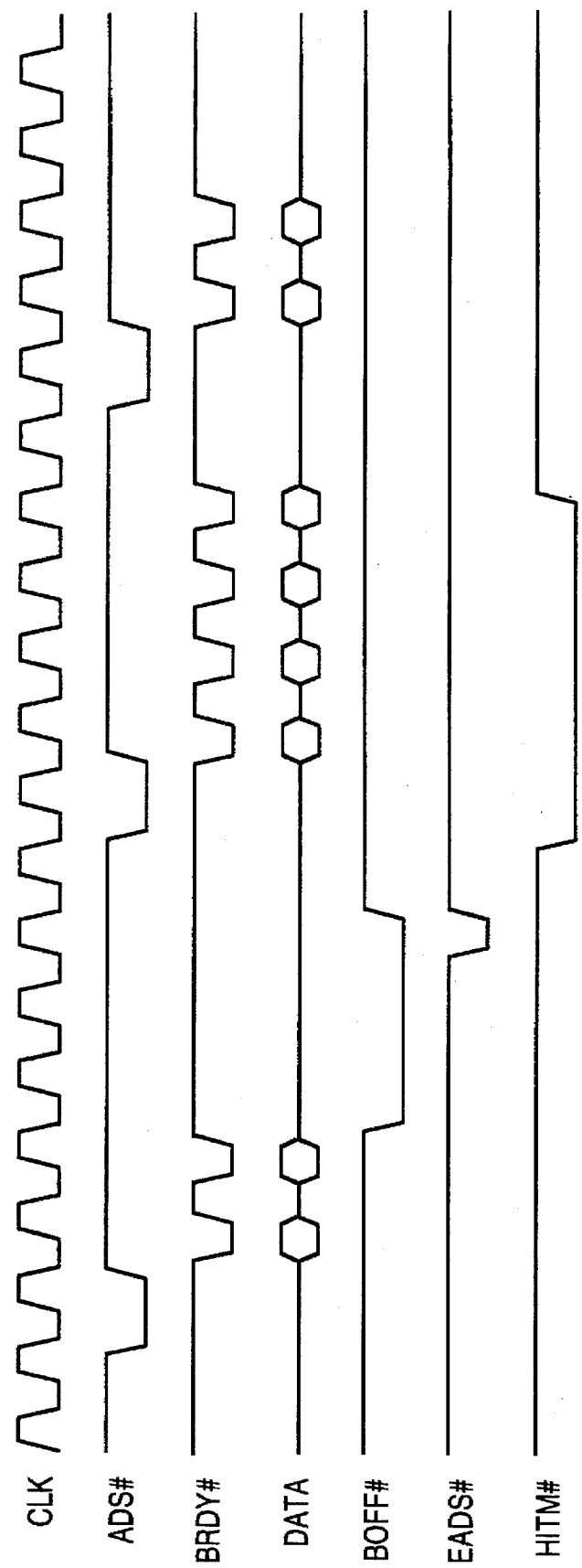
FIG. 7 is a timing diagram illustrating the operation of one implementation of the present invention.

FIG. 7 is a timing diagram illustrating the operation of one implementation of the present invention. In this example, processor 104 initiates a write operation by asserting an active low signal ADS#. This indicates a valid bus cycle definition and address is available on the cycle definition lines and address bus. Examples of bus cycle definition signals include a signal (M/IO#) to indicate whether the existing cycle is to or from a memory or input-output device, a signal (D/C#) to indicate whether the existing cycle is a data or control cycle and a signal (W/R#) to indicate whether the existing cycle is a write or read operation. Other bus cycle definition signals include the PLOCK# signal and a signal (LOCK#) indicating that the current bus cycle is locked. In this example, the write operation initiated by processor 104 is a replacement write-back transfer. The write-back transfer may also be an external snoop write-back transfer instead of a replacement write-back transfer.

Processor 104 then receives an active low burst ready input signal (BRDY#) which indicates that an external component has presented valid data in response to a read, or that the external system has accepted data in response to a write. Processor 104 also transmits the first data packet. Processor 104 receives the second BRDY# signal and transmits the second data packet.

At the end of the second data packet, external component 106 initiates an inquire operation. External component 106 asserts an active low signal (BOFF#) requesting processor 104 to float the bus in the next clock period (a backoff operation) and asserts an active low signal (EADS#) indicating that a valid external address has been driven on the address pins of processor 104. In response to the BOFF# signal, processor 104 ceases transmission of the write operation. Processor 104 does not receive the BRDY# signal and does not transmit data.

When external component 106 asserts the EADS# signal, external component 106 also transmits an address. This address is the address of the data requested by external component 106. Processor 104 compares the address to the addresses of data in its cache 105. When the address matches an address of data in cache 105 and the modified (dirty) bit is set, processor 104 asserts an active low signal (HITM#) indicating a hit to a modified line. Processor 104 then initiates a write-back transfer to external memory 102 updating the data in external memory 102 after the BOFF# signal has been deasserted. This type of write-back transfer in response to an EADS# and a HITM# signal is referred to as an external snoop write-back transfer.

Processor 104 asserts the ADS# signal and transmits in four packets the data associated with the address transmitted by external component 106. Processor 104 transmits each packet with each BRDY# signal. Upon the transmission of the four packets, external memory 102 now has an updated version of the data requested by external component 106. Processor 104 then deasserts the HITM# signal and continues the previous write operation. Processor 104 asserts the ADS# signal and transmits the remaining packets beginning from the point of interruption. Processor 104 completes transmission of each packet with a BRDY# signal.

On the other hand, when processor 104 receives a BOFF# signal during a replacement write-back transfer and the address of the external snoop write-back transfer (e.g. the address transmitted along with the EADS# signal) is the same as the address of the replacement write-back transfer, processor 104 does not transmit remaining packets from the point of interruption after the external snoop write-back transfer described above. In this case, it is not necessary for processor 104 to transmit the remaining packets because the packets are already transmitted to external memory 102 during the external snoop write-back transfer since the address of the external snoop write-back transfer is the same as the address of the replacement write-back transfer. Processor 104 instead performs the next operation.

Figure 8:
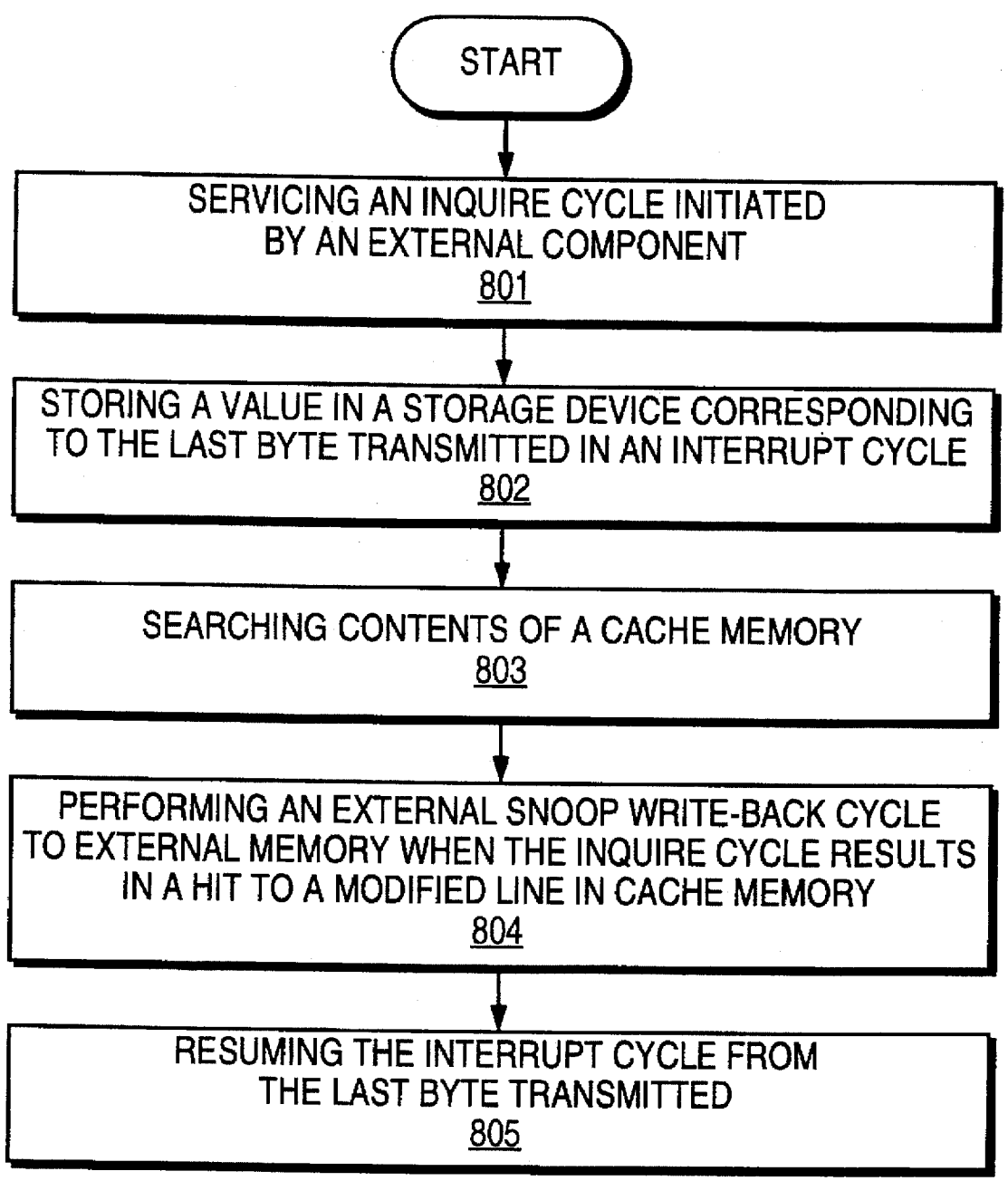
FIG. 8 is a flowchart diagram illustrating the operation of one embodiment of the processor of the present invention.

FIG. 8 is a flowchart diagram illustrating the operation of one embodiment of the processor of the present invention. In this embodiment, the processor resumes an interrupted operation by first receiving a signal requesting immediate release of a bus and servicing an inquire operation initiated by an external component. This is shown occurring in block 801.

The processor services an inquire operation by receiving a signal indicating that a valid external address has been driven on the bus and receiving the address associated with the inquire operation. In this embodiment, immediate release of a bus occurs within one clock cycle and thus, the signal requesting immediate release of a bus can be a BOFF# signal. The signal indicating that a valid external address has been driven on the bus can be an EADS# signal. The processor then stores a value in a storage device corresponding to the last packet transmitted in an interrupted operation as shown in block 802. The storage device can be a memory, a portion of memory or a register. The processor then searches contents of cache memory looking for the address associated with the inquire operation as shown in block 803. The search can be accomplished by a state machine, logic or a comparator.

Next, the processor performs an external snoop write-back transfer to external memory when the inquire operation results in a hit to a modified line in cache memory as shown in block 804. The processor performs the external snoop write-back transfer by asserting a signal indicating the hit to the modified line and transferring contents of the modified line from the cache memory to the external memory. The signal indicating the hit to the modified line can be a HITM# signal. The processor then resumes the interrupted operation from the last packet transmitted (block 805). The processor resumes the interrupted operation by retrieving the value corresponding to the last packet transmitted from the storage device, asserting a signal indicating that a valid bus cycle definition and address are available on cycle definition lines and an address bus, and transmitting data over the bus beginning from the last packet transmitted. The processor transmits data over the bus in four byte increments. In addition, the signal indicating that a valid bus cycle definition and address are available can be an ADS# signal.

Figure 9:
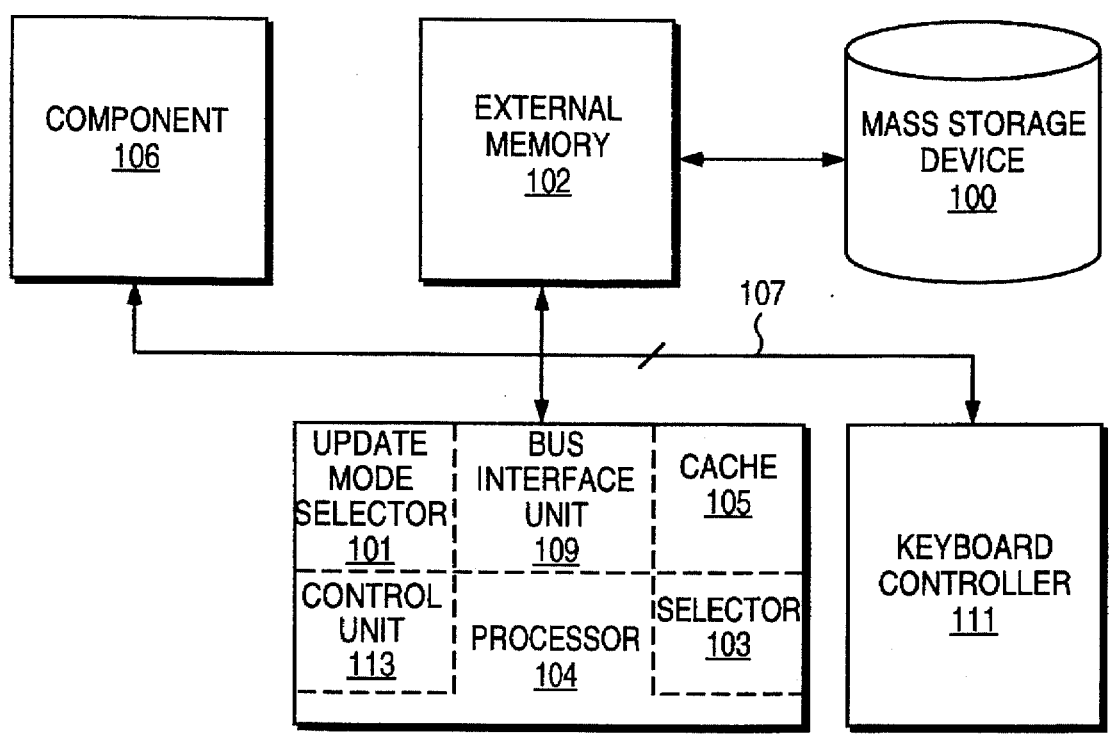
FIG. 9 illustrates in block diagram form a computer system of yet another embodiment of the present invention.

FIG. 9 illustrates in block diagram form a computer system of yet another embodiment of the present invention. In this embodiment, processor 104 also includes a selector 103 which selects the bit width of a write operation by selecting between a first mode of transferring information, where the bit width is larger than the bit width of the bus, and a second mode of transferring information from processor to external memory where the bit width is not larger than the bit width of the bus. Selector 103 may select the bit width in response to a signal provided to a BLEN# pin coupled to selector 103. When selector 103 selects a first mode of transferring information, processor 104 transfers information to external memory 102 or component 106 in a single operation. When selector 103 selects a second mode of transferring information, processor 104 transfers information to external memory 102 or component 106 in separate write operations. Thus, processor 104 can be used in both a system that accepts large bit width operations or a system that does not accept large bit width operations.

Selector 103 may reside in control unit 113 or separately from control unit 113 in processor 104. Selector 103 may also be coupled to a pin. For example, a first signal transmitted by an external device to the pin may indicate that the computer system can accept a write operation having a bit width larger than the bit width of the bus during a write-back transfer. In response to the first signal, selector 103 selects a first mode of transferring information during a write-back transfer. A second signal may indicate that the computer system cannot accept a write operation having a bit width larger than the bit width of the bus. In response to the second signal, selector 103 selects a second mode of transferring information during a write-back transfer.

Figure 10:
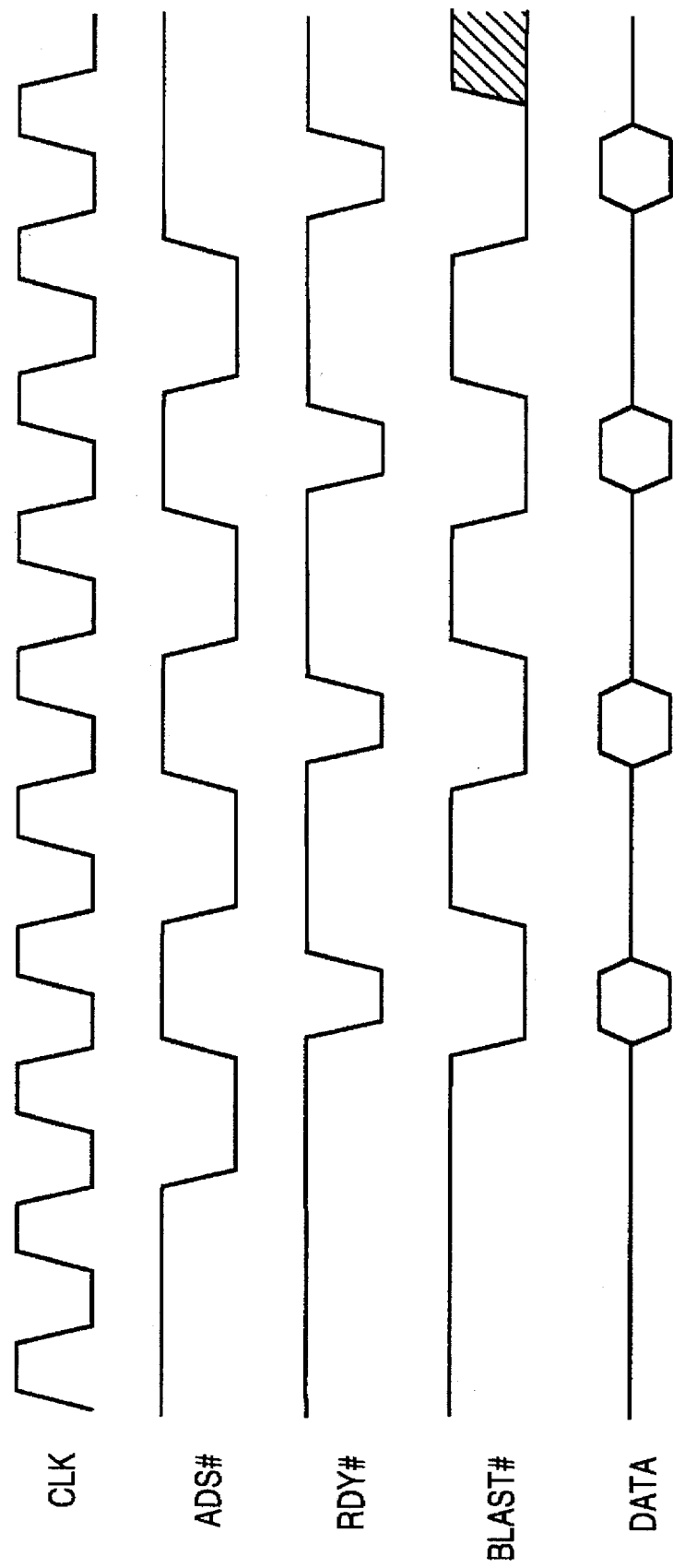
FIG. 10 illustrates in the form of a timing diagram the second mode of transferring data.

FIG. 10 illustrates in the form of a timing diagram a second mode of transferring data. In the second mode, the processor transfers data in separate write operations. Each write operation is independent and distinct from the other. The number of write operations necessary to accomplish the transfer depends on the size of data being transferred and the size of data transferred in each write operation. For instance, if 16 bytes is to be transferred by the processor and each write operation transfers four bytes, then four write operations are required to transfer the entire 16 bytes of information.

The processor initiates the transfer of data in this mode by first asserting an ADS# signal which occupies one clock period. Because the ADS# signal is an active low signal, the processor asserts the signal by transmitting a low signal state. After the processor asserts the ADS# signal, the processor transfers data for one write operation which also occupies one clock period. Then the processor asserts another ADS# signal and transfers data for another write operation. The steps are repeated until completion of data transfer. In the example described above, the processor transfers four bytes in each write operation. Four write operations are required to transfer the total of 16 bytes. Since four write operations are required, the processor asserts four ADS# signals each occupying one clock period. The processor also transfers data four times each also requiring one clock period. Thus, the processor utilizes a minimum of eight clock periods to complete the transfer of 16 bytes.

Figure 11:
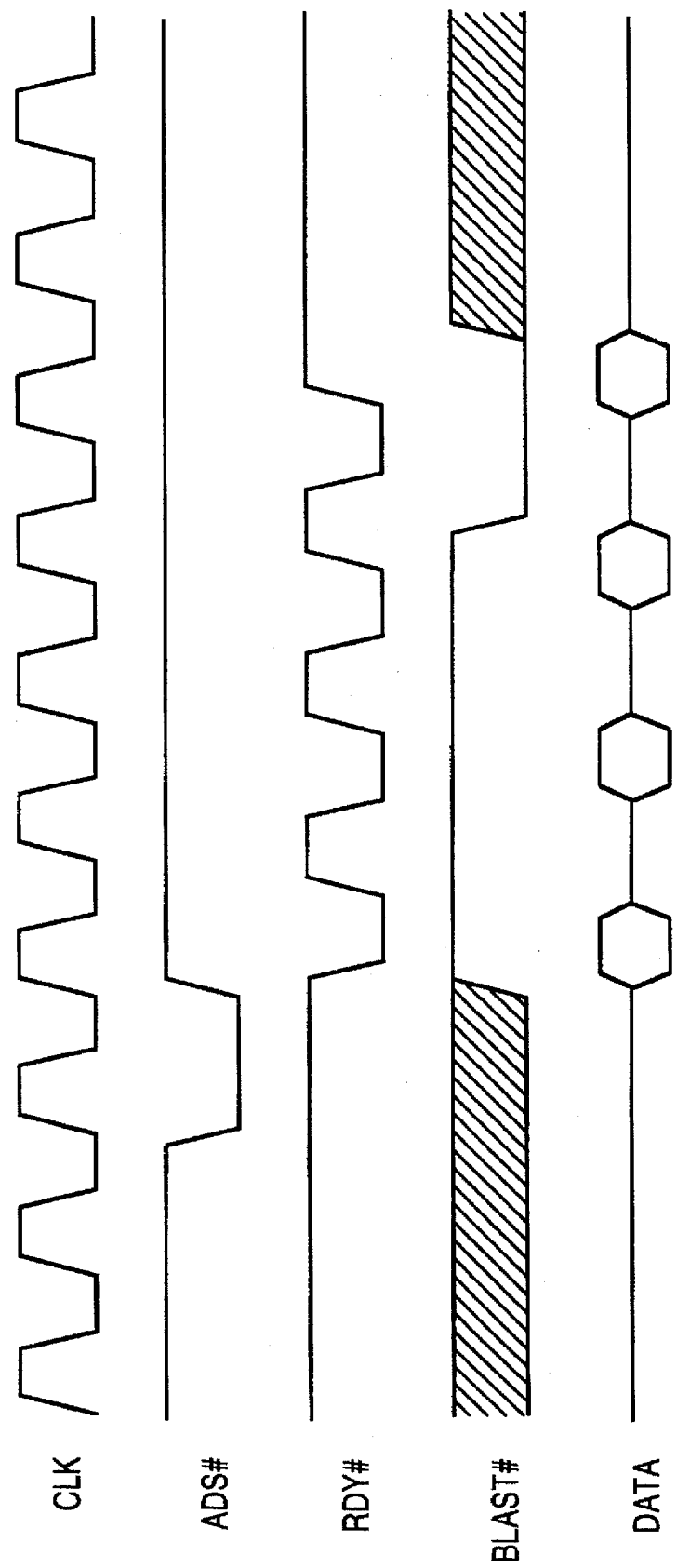
FIG. 11 illustrates in the form of a timing diagram the first mode of transferring data.

FIG. 11 illustrates in the form of a timing diagram the first mode of transferring data. In the first mode, the processor transfers data in a single operation. The processor initiates the single burst transaction by asserting an ADS# signal. The assertion of the ADS# signal occupies one clock period as in the non-burst mode. After the processor asserts the ADS# signal, the processor transfers data. However, the transfer of data may be broken into separate increments depending on the total size of data transferred and the size of data transferred in each increment. Each transfer of a data increment requires one clock period. Using the example described above, a transfer of 16 bytes with four bytes transferred per increment requires four increments as illustrated in FIG. 11. However, unlike in the second mode, the processor only asserts one ADS# signal at the beginning of the burst transaction. After the ADS# signal, the processor transfers data in four increments of four bytes each. Thus, the processor utilizes a minimum of five clock periods to complete the transfer of 16 bytes. It is to be appreciated that the first mode can result in savings of clock periods especially for larger data transfers. In this example, the second mode consumes eight clock periods and thus, utilizing the first mode results in savings of three clock periods.

Figure 12:
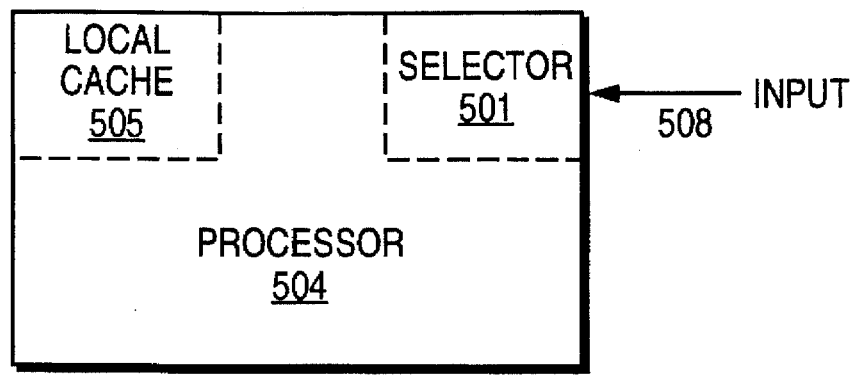
FIG. 12 illustrates still another embodiment of the present invention.

FIG. 12 illustrates still another embodiment of the present invention in which processor 504 includes selector 501 and input 508. Input 508 is coupled to selector 501 and receives external signals in the form of signal states. One signal state transmitted through input 508 to selector 501 indicates the selection of a first mode of transferring information. A second signal state transmitted through input 508 to selector 501 indicates the selection of a second mode of transferring information. The first signal state can be generated by coupling input 508 to a first voltage potential and the second signal state can be generated by coupling input 508 to a second voltage potential. Under an alternative embodiment, input 508 can be coupled to a pin thus, providing a link for external devices to supply input signals to selector 501.

The transfer of information by processor 504 may occur during a write-back transfer. During normal operation, processor 504 stores information in local cache 505. A write-back transfer occurs when processor 504 needs to remove information from local cache 505 to create memory space in local cache 505 or when processor 504 needs to update information in external memory using the information in local cache 505. In an alternative embodiment, processor 504 performs the write-back function in accordance with the selection made by selector 501. Thus, processor 504 performs the write-back transfer in either the first mode or second mode depending on the selection made by selector 501.

Figure 13:
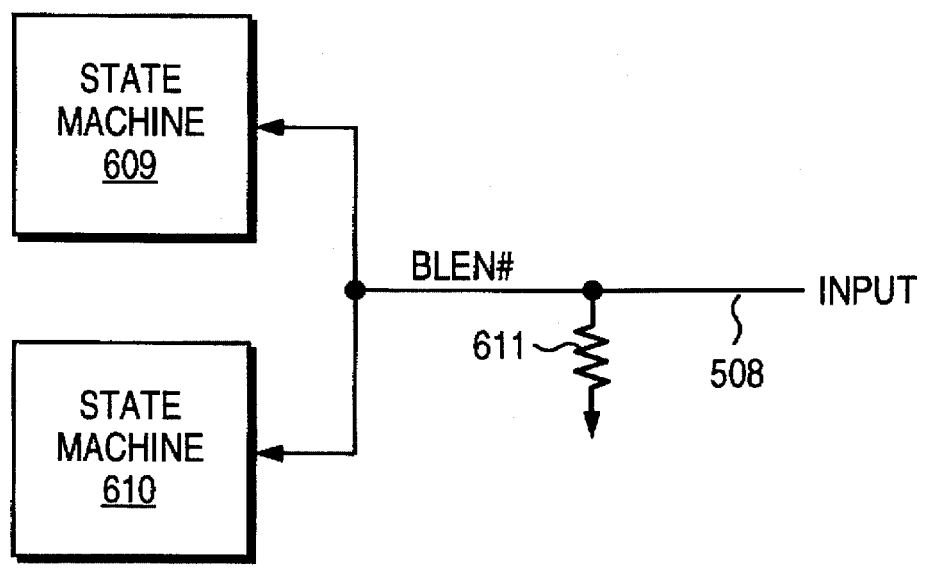
FIG. 13 illustrates in circuit diagram form the selector of FIG. 12.

FIG. 13 illustrates in circuit diagram form the selector of FIG. 12. The selector comprises an input 508, a pull-down resistor 611, state machine 609 and state machine 610. Input 508 is coupled to the pull-down resistor and the pull-down resistor 611 in turn is coupled to ground. In this embodiment, the pull-down resistor has a resistance of about 30–50 Kohms. Input 508 is also coupled to state machine 609 and state machine 610. Input 508 is also coupled to a pin which can be labeled as BLEN#. Input 508 can receive a first signal or a second signal through the BLEN#pin. In this embodiment, the first signal is a high voltage potential of five volts or five volts or 3.3 volts and the second signal is a low voltage potential of zero volts or ground potential. When a first signal is transmitted through input 508, state machine 609 and state machine 610 both see a high voltage potential. In response to the high voltage potential, state machine 609 is activated and transfers information from the processor in a first mode.

State machine 610 on the other hand, is deactivated by a high voltage potential. When a second signal state is transmitted through input 508, state machine 609 and state machine 610 receive a low voltage potential. In this situation, state machine 609 is deactivated, but state machine 610 is activated and transfers information from the processor in a second mode. When neither a first signal nor a second signal is transmitted through input 508, and input 508 is left floating, the pull-down resistor acts to pull the BLEN# line to a low potential. In this case, state machine 609 and state machine 610 both see a low potential. As described above, state machine 609 is deactivated but state machine 610 is activated and transfers information from the processor in a second mode.

Figure 14:
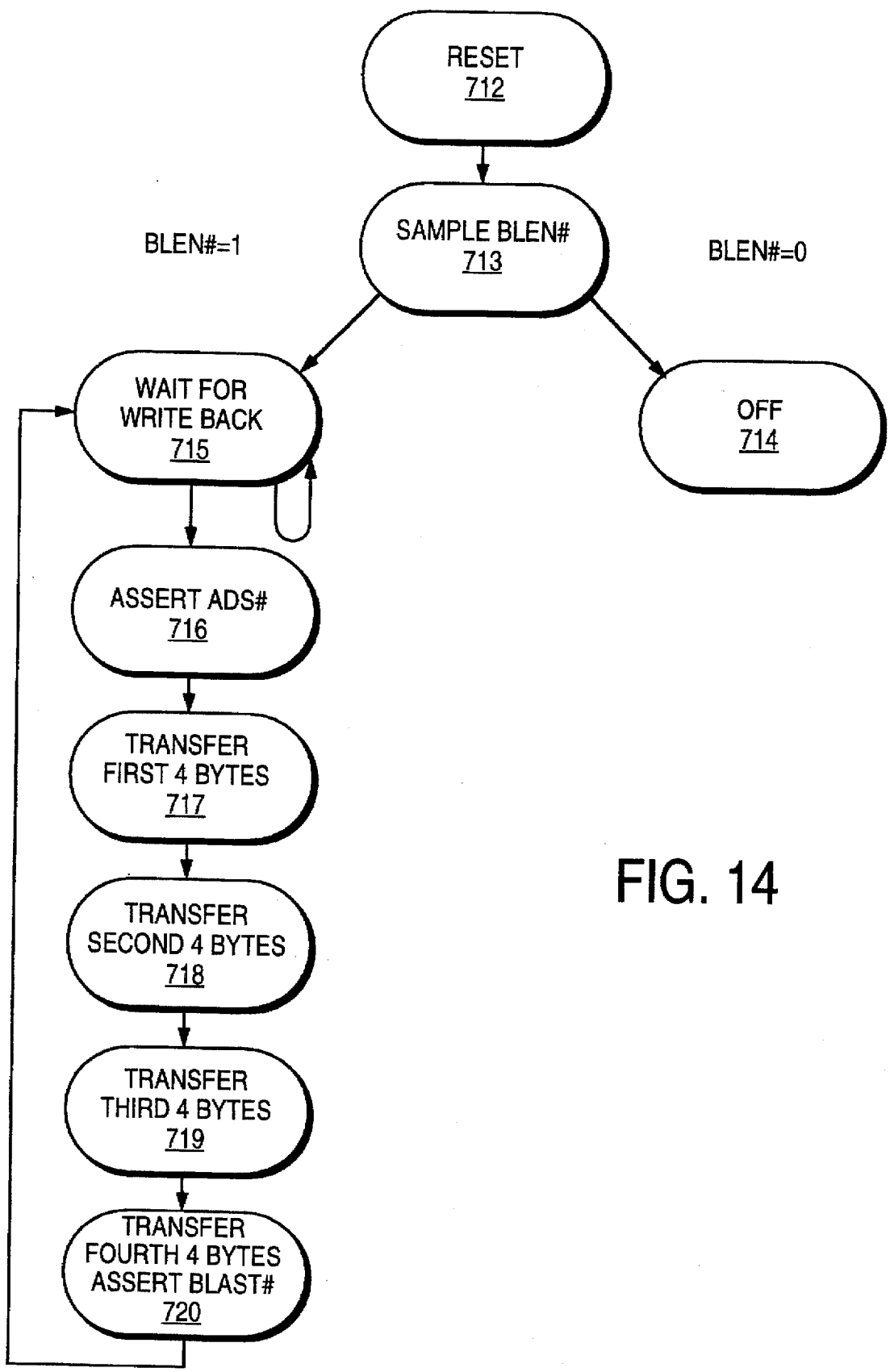
FIG. 14 illustrates in state diagram form the operation of the first state machine of FIG. 13.

FIG. 14 illustrates in state diagram form the operation of the first state machine of FIG. 13. When the processor is initially powered, state machine 609 starts in the RESET mode as shown in state 712. State machine 609 then transitions to state 713 where state machine 609 samples the BLEN# line. If BLEN# line is at a low potential, state machines 609 transitions to OFF state 714 (i.e., state machine 609 is deactivated). On the other hand, if BLEN# is at a high potential, the processor enters the first mode and state machine 609 transitions to state 715. In state 715, state machine 609 waits for the initiation of a write-back transfer.

When a write-back transfer occurs, state machine 609 transitions to state 716. State machine 609 begins the write operation by asserting an ADS# signal. State machine 609 then transitions to state 717 where state machine 609 transfers the first four bytes of the write-back transfer. State machine 609 then transitions to state 718 where state machine 609 transfers the second four bytes of the write-back transfer. State machine 609 then transitions to state 719 where it transfers the third four bytes of the write-back transfer. After state 719, state machine 609 transitions to state 720 where it transfers the fourth four bytes of the write-back transfer. After the last four bytes is transferred, state machine 609 transitions back to state 715 where it waits for the next write-back transfer.

Figure 15:
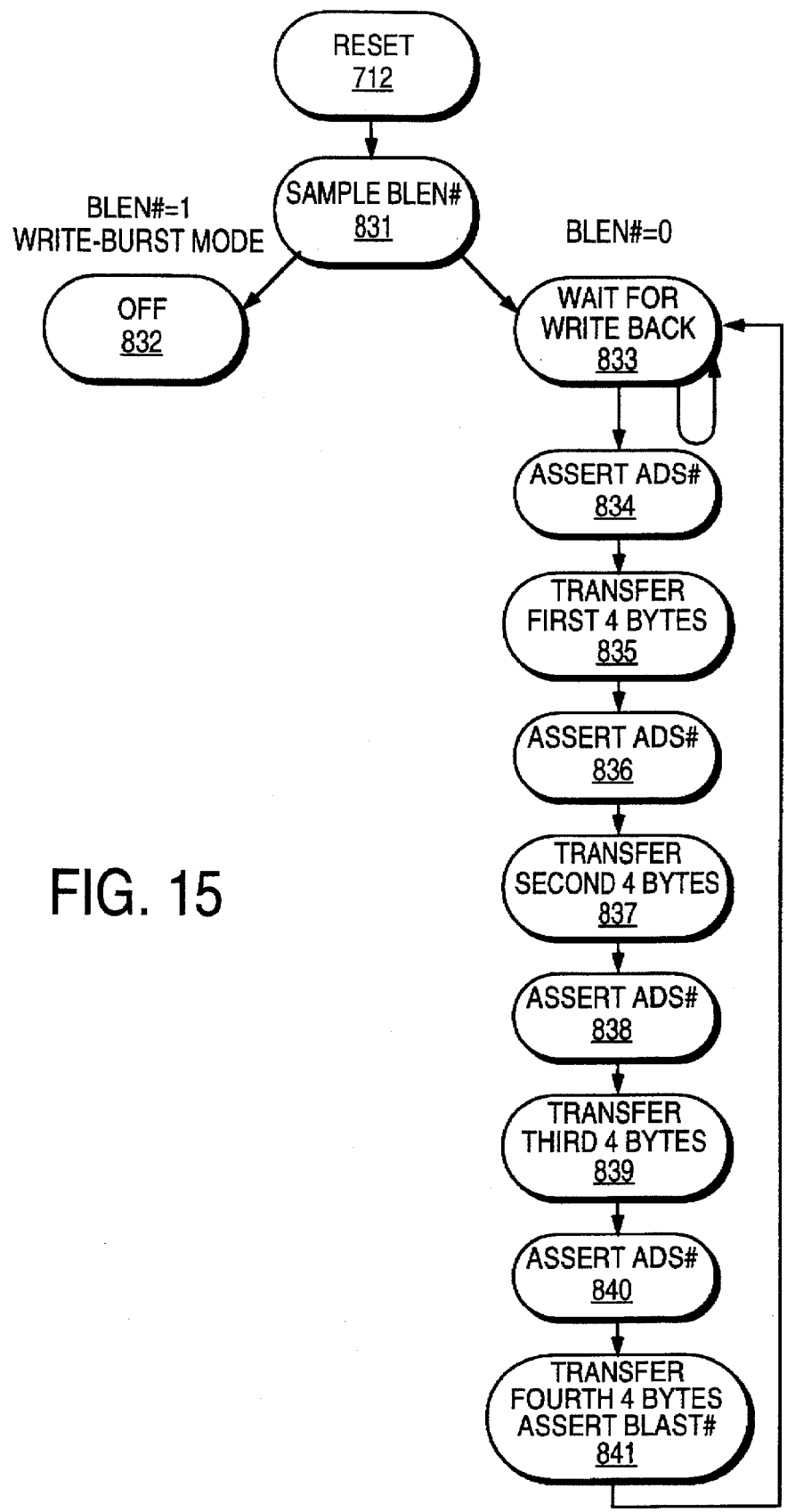
FIG. 15 illustrates in state diagram form the operation of the second state machine of FIG. 13.

FIG. 15 illustrates in state diagram form the operation of the second state machine of FIG. 13. When the processor is powered up, state machine 610 powers up in the RESET mode as shown in state 830. State machine 610 then transitions to state 831 where it samples the BLEN# line. If the BLEN# line is at a high voltage potential, the processor transfers information in a first mode and state machine 610 transitions to OFF state 832 where it is deactivated.

On the other hand, if the BLEN# line is at a low potential, the processor transfers information in a second mode and state machine 610 transitions to state 833. In state 833, state machine 610 waits for the initiation of the write-back transfer. When the processor is ready to perform a write-back transfer, state machine 610 transitions to state 839 and begins the write-back transfer by asserting an ADS# signal. State machine 610 then transitions to state 835 where it transfers the first four bytes of the write-back transfer. It then transitions to state 836 where it asserts the second ADS# signal. State machine 610 then transitions to state 837 where it transfers the second four bytes of the write-back transfer. After state 837, state machine 610 transitions to state 838 where it asserts the third ADS# signal. After the third ADS# signal, state machine 610 transitions to state 839 where it transfers the third four bytes of the write-back transfer. After state 839, state machine 610 transitions to state 840 where it asserts the fourth ADS# signal and transitions to state 841 where it transfers the fourth four bytes of the write-back transfer. Afterwards, state machine 610 transitions back to state 833 where it waits for the next write-back transfer.

Figure 16:
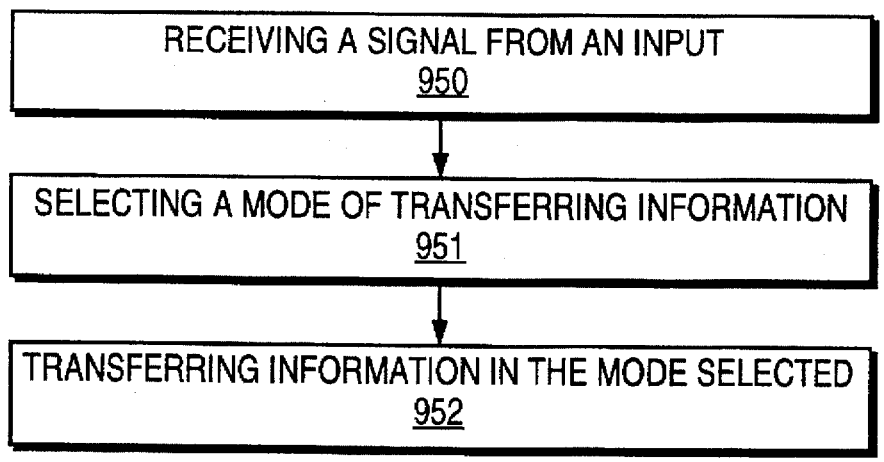
FIG. 16 illustrates in flow chart diagram an operation of one embodiment of the present invention.

FIG. 16 illustrates in flow chart diagram an operation of one embodiment of the present invention. In this embodiment, as shown in block 950, the processor first receives a signal from an input indicating one of a plurality of possible modes of transferring information. The possible modes can be a first mode and a second mode or other combinations of other modes. After receiving the signal, the processor selects the mode of transferring information indicated by the signal as shown in block 951. The processor can select between a first mode or a second mode or other combinations of other modes. The processor can also select one mode for transferring information during a write-back transfer and select another mode of transferring information during other write operations. After selecting the mode of transferring information, the processor transfers the information in the mode selected as shown in block 952. The selector selects between a first mode of transferring information and a second mode of transferring information only for write-back transfers from processor to external memory. Thus, the selector only selects modes for write-back operations and only affects write-back operations. Other write operations are unaffected by the selection made by the selector.

Figure 17:
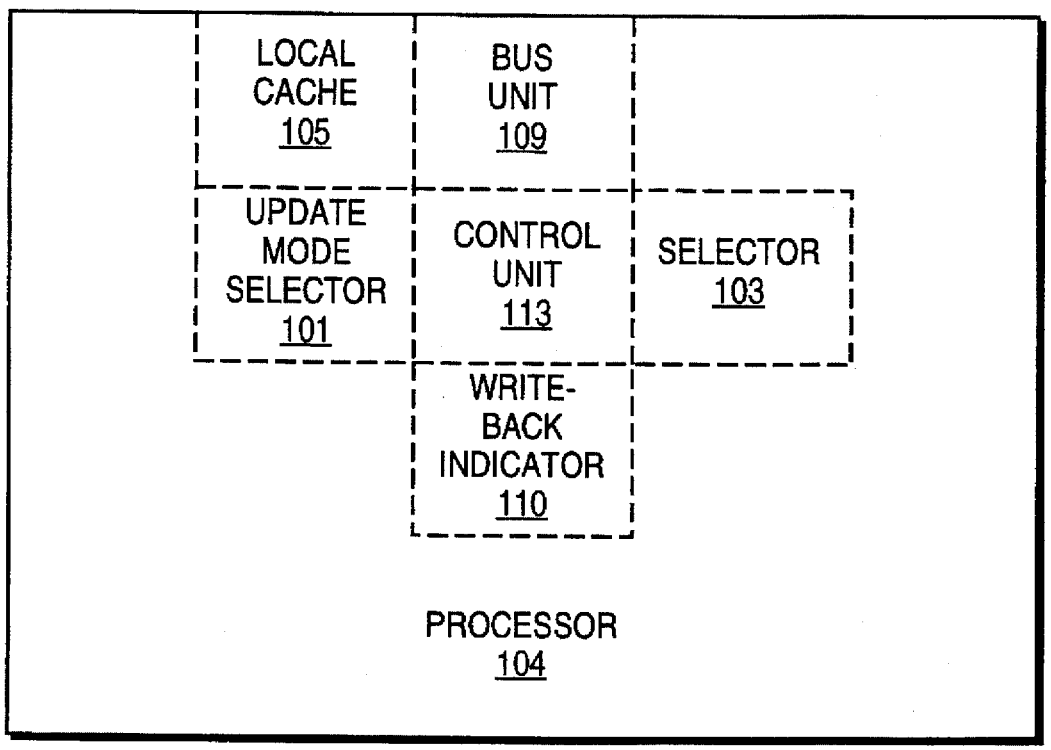
FIG. 17 illustrates in block diagram form a processor of a fourteenth embodiment of the present invention.

Alternatively, processor 104 may include update mode selector 101 and write-back indicator 110 as shown in FIG. 17. Update mode selector 101 selects the mode used to update external memory. Update mode selector 101 can reside in control unit 113 or can reside separately from control unit 113 in processor 104. Write-back indicator 110 indicates the start of a write-back transfer every time a write-back transfer is initiated by processor 104. Write-back indicator 110 can reside in control unit 113 or can reside separately from control unit 113 in processor 104.

Processor 104 can incorporate two or more of the following modes of updating external memory. The first mode of updating external memory is the write-through mode. The second mode of updating external memory is the buffered write-through mode. The third mode of updating external memory is the write-back mode. When update mode selector 101 selects the write-back mode, write-back indicator 110 allows computer systems designed for the second processors to distinguish between the start of a new write-back transfer from an ongoing write operation or write-back operation. The computer system may distinguish between the start of a new write-back transfer from an ongoing write operation by a signal transmitted on bus 107 by write-back indicator 110. This feature allows the computer system to perform operations which require the ability to distinguish between the two. One such operation is writing an entire line of four individual write operations during a write-back transfer to a buffer and transferring the entire line as a whole to memory.

Figure 18:
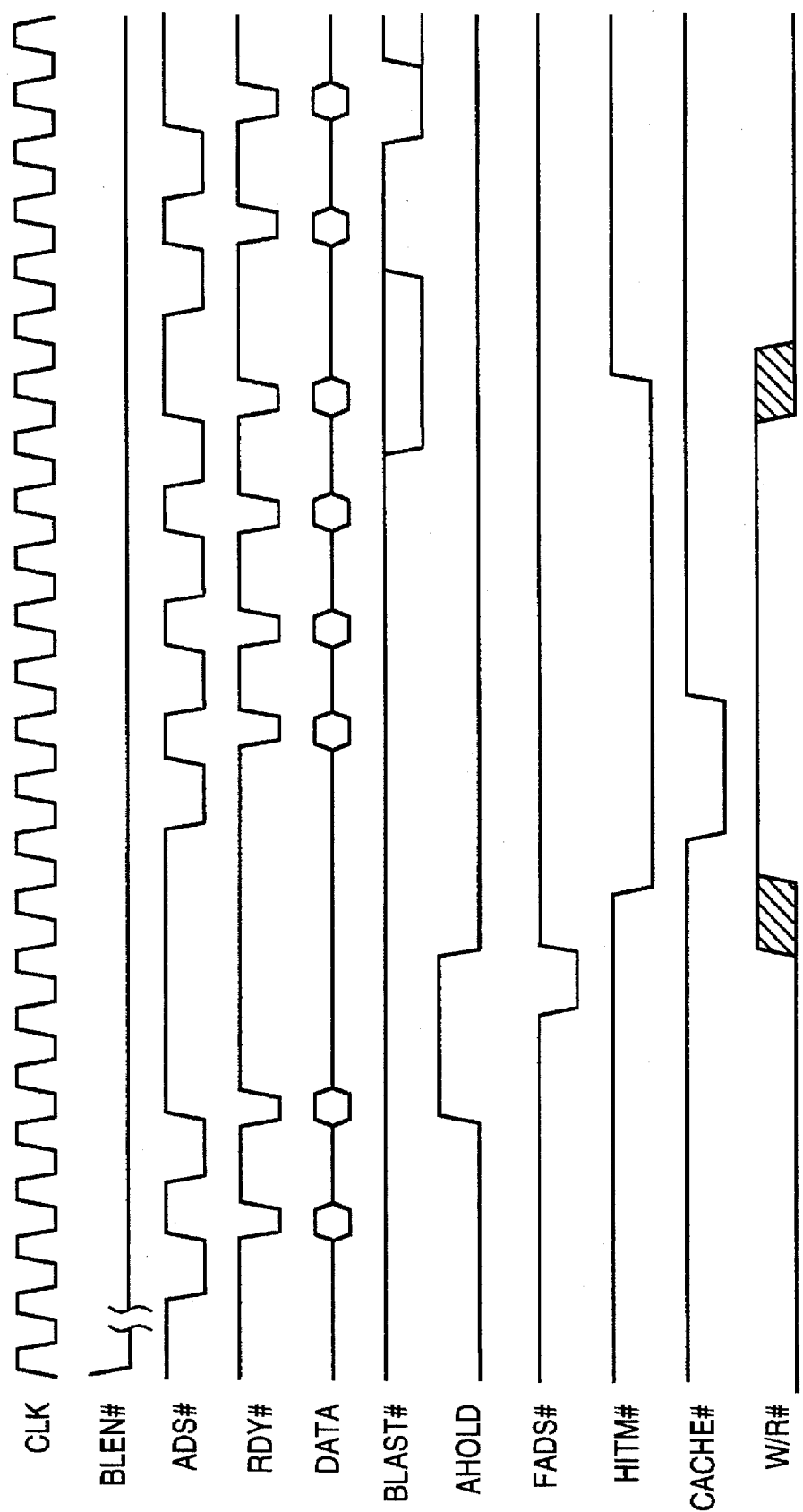
FIG. 18 illustrates in timing diagram form an operation of the processor of the present invention.

FIG. 18 illustrates in timing diagram form an operation of the processor of the present invention. For purposes of illustration, a replacement write-back transfer is shown and the system is shown to return RDY# selecting a non-burst transfer mode. In a non-burst transfer mode, each write of a write operation is preceded by an active low ADS# signal at least one clock before the write. The ADS# signal is asserted on bus 107 by control unit 113 in processor 104 and indicates that processor 104 is ready to transfer data.

When the computer system needs information in cache 105, a write-back transfer to external memory has to be performed by processor 104 from cache 105. The computer system initiates a write-back transfer by asserting an active low EADS# signal. If cache 105 has the information desired by the computer system and the information has been modified, it performs a write-back transfer of the information to the external memory. However, the computer system may assert the EADS# signal while processor 104 is in the middle of a write operation as illustrated in FIG. 18. Although processor 104 is in the middle of a write operation, it will perform the snoop write-back transfer before the write operation is completed. When processor 104 performs the snoop write-back transfer it asserts the same ADS# signal as when it performs the replacement write-back transfer.

The computer system is able to distinguish between the start of a new write-back transfer from an ongoing write operation because write-back indicator 110 asserts an active low CACHE # signal during the same clock the first ADS# of a write-back transfer is asserted. The CACHE# signal indicates that the current write operation is a write-back transfer. The processor then transfers data in the next clock as shown in FIG. 18. Write-back indicator 110 deasserts the CACHE# signal after the transfer of the first data packet and keeps the CACHE# signal deasserted until the beginning of the next write-back transfer.

In a particular implementation of the present invention, control unit 113 generates a HITM# signal and a W/R# signal. The active low HITM# signal is asserted by control unit 113 after an EADS# signal when the address accompanying the EADS# signal is in cache 105 and has been modified. In this implementation, HITM# is asserted two clock cycles after the EADS# signal. Thus, the assertion of the HITM# signal indicates a cache hit to a modified line. If the address is not in cache 105 or has not been modified, the HITM# signal is not asserted. After processor 104 initiates a write-back transfer of information associated with the address, HITM# is deasserted as shown in FIG. 18. Here, HITM# is deasserted in the same clock cycle that the write-back transfer is completed. On the other hand, the W/R# signal is asserted low by control unit 113 when processor 104 is performing a read and asserted high when processor 104 is performing a write operation. For example, W/R# is asserted high in the same clock cycle that the first ADS# signal of the write-back transfer is asserted; it is asserted low in the same clock cycle that the write-back transfer is completed.

In another implementation, processor 104 asserts and deasserts four signals: ADS#, CACHE#, W/R# and HITM#. Because of the four signals, the computer system can distinguish the start of a new write-back transfer from an ongoing write operation. Also, it can distinguish between different write-back transfers.

Another possibility is to have processor 104 perform two different types of write-back transfers. The first type is a replacement write-back transfer. A replacement write-back transfer occurs when processor 104 pulls information from external memory to put in cache 105 while cache 105 is full. To create memory capacity in cache 105 for the new information, processor 104 performs a write-back transfer of existing information in cache 105 to external memory and replaces the existing information with new information from external memory. The second type is an external snoop write-back transfer. An external snoop write-back transfer occurs when another processor or other external component requests information in which the most recent version resides in cache 105. To allow access to the desired information, processor 104 performs a write-back transfer of the information to external memory. The other processor or other external component can then access the information from external memory.

The computer system can determine the beginning of a replacement write-back transfer and an external snoop write-back transfer by examining the signal state of the four signals, ADS#, CACHE#, W/R# and HITM#. When ADS# is asserted low, this indicates to the computer system that the processor is ready for a data transfer. When W/R# is asserted high at the same time, this indicates to the computer system that the data transfer will be a write. When CACHE# is asserted low at the same time, this indicates to the computer system that the write will be the start of a new write-back transfer instead of an ongoing write operation. If HITM# is found asserted low, this indicates to the computer system that the write-back transfer is an external snoop write-back transfer. On the other hand, if HITM# is found asserted high, this indicates to the computer system that the write-back transfer is a replacement write back transfer.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

We claim:

1. A data processor comprising:
    a bus interface unit configured to receive information from an external bus and to transmit information onto said external bus;
    a cache memory coupled to said bus interface unit, said cache memory being configured to store said information;
    a control unit coupled to said bus interface unit and said cache memory, said control unit being configured to update an external memory with said information from said cache memory in a first mode or a second mode; and
    a select circuit coupled to said control unit, said select circuit including an input configured to receive a mode update signal that determines a selected one of said first or second modes, said mode update signal being sampled on a falling edge of a reset signal that occurs within a first period.

2. The data processor of claim 1, wherein said mode update signal has a first state or a second state when sampled, said first state of said mode update signal indicates the selection of said first mode of updating said external memory and said second state of said mode update signal indicates the selection of said second mode of updating said external memory.

3. The data processor of claim 2, wherein said first state is a logic low voltage level and said second state is a logic high voltage level.

4. The data processor of claim 1, wherein said first mode of updating said external memory comprises a write-through mode.

5. The data processor of claim 1, wherein said second mode of updating said external memory comprises a write-back mode.

6. The data processor of claim 5, wherein said input of said select circuit may receive said mode update signal having said first state or said second state after the selection of said second mode of updating said external memory, said first state of said mode update signal indicates said second mode of updating said external memory is operating in a write-through mode, said second state of said mode update signal indicates said second mode of updating said external memory is operating in a write-back mode.

7. The data processor of claim 1, wherein said input of said select circuit is coupled to a pin.

8. The data processor of claim 7, wherein said pin is left floating.

9. The data processor of claim 8, further comprising a pull-down resistor coupled to said input of said select circuit, and wherein said input of said select circuit provides a signal having said first state when said pin is left floating.

10. The processor of claim 1, wherein said select circuit resides in said control unit.

11. The processor of claim 1, wherein said first period starts not more than one clock cycle before said falling edge of said reset signal and ends not more than one clock cycle after said falling edge of said reset signal.

12. In a data processor, a method for updating external memory comprising:
    (a) receiving a mode update signal indicating a first update mode of said external memory or a second update mode of said external memory;
    (b) sampling said mode update signal on a falling edge of a reset signal during a first period;
    (c) determining a selected one of said first or second update modes;
    (c) altering information in said cache memory; and
    (d) updating said external memory using said selected one of said first or second update modes.

13. The method of claim 12, wherein said first update mode comprises a write-through mode.

14. The method of claim 12, wherein said second update mode comprises a write-back mode.

* * * * *